United States Patent
Hoshino et al.

(10) Patent No.: US 11,431,048 B2
(45) Date of Patent: Aug. 30, 2022

(54) ENERGY STORAGE APPARATUS

(71) Applicants: GS Yuasa International Ltd., Kyoto (JP); Honda Motor Co., Ltd., Tokyo (JP)

(72) Inventors: Motoki Hoshino, Kyoto (JP); Yuta Yamamoto, Kyoto (JP); Masao Kawata, Saitama (JP); Jun Machida, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 993 days.

(21) Appl. No.: 14/814,116

(22) Filed: Jul. 30, 2015

(65) Prior Publication Data
US 2017/0033336 A1 Feb. 2, 2017

(51) Int. Cl.
*H01M 50/20* (2021.01)
*H01M 10/647* (2014.01)
(Continued)

(52) U.S. Cl.
CPC .......... *H01M 50/20* (2021.01); *H01M 10/613* (2015.04); *H01M 10/625* (2015.04); *H01M 10/647* (2015.04); *H01M 10/6557* (2015.04); *H01M 10/6561* (2015.04); *H01M 2220/20* (2013.01)

(58) Field of Classification Search
CPC ...... H01M 2/10; H01M 10/50; H01M 2/1077; H01M 10/613; H01M 10/625; H01M 10/647; H01M 10/6557; H01M 10/6561; H01M 2220/20; H01M 50/20;
(Continued)

(56) References Cited

U.S. PATENT DOCUMENTS

2011/0097614 A1   4/2011   Kim
2011/0104547 A1*  5/2011   Saito ............... H01M 2/1077
                                                    429/120

(Continued)

FOREIGN PATENT DOCUMENTS

JP   2011-091043 A   5/2011
JP   2011-129509 A   6/2011
(Continued)

*Primary Examiner* — Stewart A Fraser
*Assistant Examiner* — Lilia Nedialkova
(74) *Attorney, Agent, or Firm* — McGinn IP Law Group, PLLC

(57) ABSTRACT

An energy storage apparatus includes: prismatic energy storage devices that are arranged in a row in a first direction and a holder; the holder holds the energy storage devices; the holder includes a pair of terminal members that are arranged outside the energy devices, connecting portions and a reinforcing portion that reinforces the connecting portions; the connecting portions connect the pair of terminal members and extend along corner portions of the energy storage devices; each one of the plurality of connecting portions includes a bent surface that fits the corner portions of the energy storage devices, the bent surfaces constraining the corner portions and extending in the first direction, and the reinforcing portion, at a middle position of the connecting portion in the first direction, extends in a forth direction that intersects with the first direction, and connects the connecting portions.

20 Claims, 9 Drawing Sheets

(51) Int. Cl.
*H01M 10/6561* (2014.01)
*H01M 10/6557* (2014.01)
*H01M 10/613* (2014.01)
*H01M 10/625* (2014.01)

(58) Field of Classification Search
CPC ............ H01M 50/209; H01M 50/264; H01M 50/291; H01M 50/296; Y02E 60/10; Y02P 70/50
See application file for complete search history.

(56) References Cited

U.S. PATENT DOCUMENTS

| | | |
|---|---|---|
| 2011/0151309 A1 | 6/2011 | Park et al. |
| 2011/0200862 A1 | 8/2011 | Kurosawa |
| 2012/0003526 A1 | 1/2012 | Kume et al. |
| 2012/0141855 A1 | 6/2012 | Okada et al. |
| 2012/0244403 A1* | 9/2012 | Maskew ............. H01M 2/1223 429/99 |
| 2013/0224547 A1 | 8/2013 | Ahn |
| 2015/0129332 A1* | 5/2015 | Seto ...................... H02J 7/0013 180/65.1 |
| 2015/0333304 A1* | 11/2015 | Sekine .................. H01M 50/20 429/153 |

FOREIGN PATENT DOCUMENTS

| | | | |
|---|---|---|---|
| JP | 2011-171029 A | 9/2011 | |
| JP | 2012-014962 A | 1/2012 | |
| JP | 2012-123905 A | 6/2012 | |
| JP | 2012-160347 A | 8/2012 | |
| JP | 2012-238603 A | 12/2012 | |
| JP | 2012-256465 A | 12/2012 | |
| JP | 2013-175464 A | 9/2013 | |
| WO | WO-2014024425 A1 * | 2/2014 | ............. H02J 7/007 |
| WO | WO-2014/103007 A1 | 7/2014 | |

* cited by examiner

ENERGY STORAGE APPARATUS

CROSS-REFERENCE TO RELATED APPLICATIONS

This application claims the benefit of Japanese patent application No. 2014-155011, filed on Jul. 30, 2014, which is incorporated by reference.

FIELD

The present invention relates to an energy storage apparatus provided with energy storage devices.

BACKGROUND

Conventionally, there has been known a battery pack provided with a plurality of battery cells (see JP-A-2012-238603). Such a battery pack includes: a battery stack formed by stacking a plurality of battery cells in the same posture; a pair of end plates arranged on both end sides of the battery stack; and a strip-like extension fastening member which connects the pair of end plates to each other.

In the battery pack, the pair of end plates is connected to each other by the extension fastening member in a state where the pair of end plates sandwiches the battery stack in the stacking direction of the battery cells and hence, a force directed toward the inside in the stacking direction is applied to both ends of the battery stack. Further, by arranging the extension fastening member along the battery stack, the displacement of the battery cells in the direction orthogonal to the stacking direction is restricted. With this configuration, in the energy storage apparatus, the plurality of battery cells are integrally fixed to each other.

Since the energy storage apparatus is mounted on a vehicle or the like, there may be a case where a force in the direction which intersects with the stacking direction is applied to the battery stack during use. In this case, to prevent the extension fastening member from being deflected by being pushed by the battery stack or some battery cells which form the battery stack in the energy storage apparatus, the extension fastening member has a sufficient plate thickness so that strength (rigidity) of the extension fastening member is secured.

Recently, there has been a demand for the miniaturization of a battery pack. In view of such circumstances, there has been proposed an idea of miniaturizing the energy storage apparatus while maintaining an output of the energy storage apparatus by decreasing a thickness of the extension fastening member without changing a size of each battery cell.

However, the fixing of the extension fastening member is performed by merely fixing both ends of the extension fastening member to the end plates. Accordingly, in the case where a thickness of the extension fastening member is decreased so that rigidity of the extension fastening member is lowered, when a force is applied to the battery stack in the direction which intersects with the stacking direction, the extension fastening member is pushed by the battery stack or some battery cells of the battery stack and the extension fastening member is liable to be deflected or deformed. Accordingly, in the case where a thickness of the extension fastening member is decreased so as to miniaturize the energy storage apparatus, when a force in the direction which intersects with the stacking direction is applied to the battery stack, the displacement of the battery cells or the like is liable to occur in the battery stack.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus which can realize the miniaturization of the apparatus while maintaining rigidity of a holder.

An energy storage apparatus according to an aspect of the present invention includes: prismatic energy storage devices that are arranged in a row in a first direction and a holder; the holder holds the energy storage devices; the holder includes a pair of terminal members that are arranged outside the energy devices, connecting portions and a reinforcing portion that reinforces the connecting portions; the connecting portions connect the pair of terminal members and extend along corner portions of the energy storage devices; each one of the plurality of connecting portions includes a bent surface that fits the corner portions of the energy storage devices, the bent surfaces constraining the corner portions and extending in the first direction, and the reinforcing portion, at a middle position of the connecting portion in the first direction, extends in a forth direction that intersects with the first direction, and connects the connecting portions.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
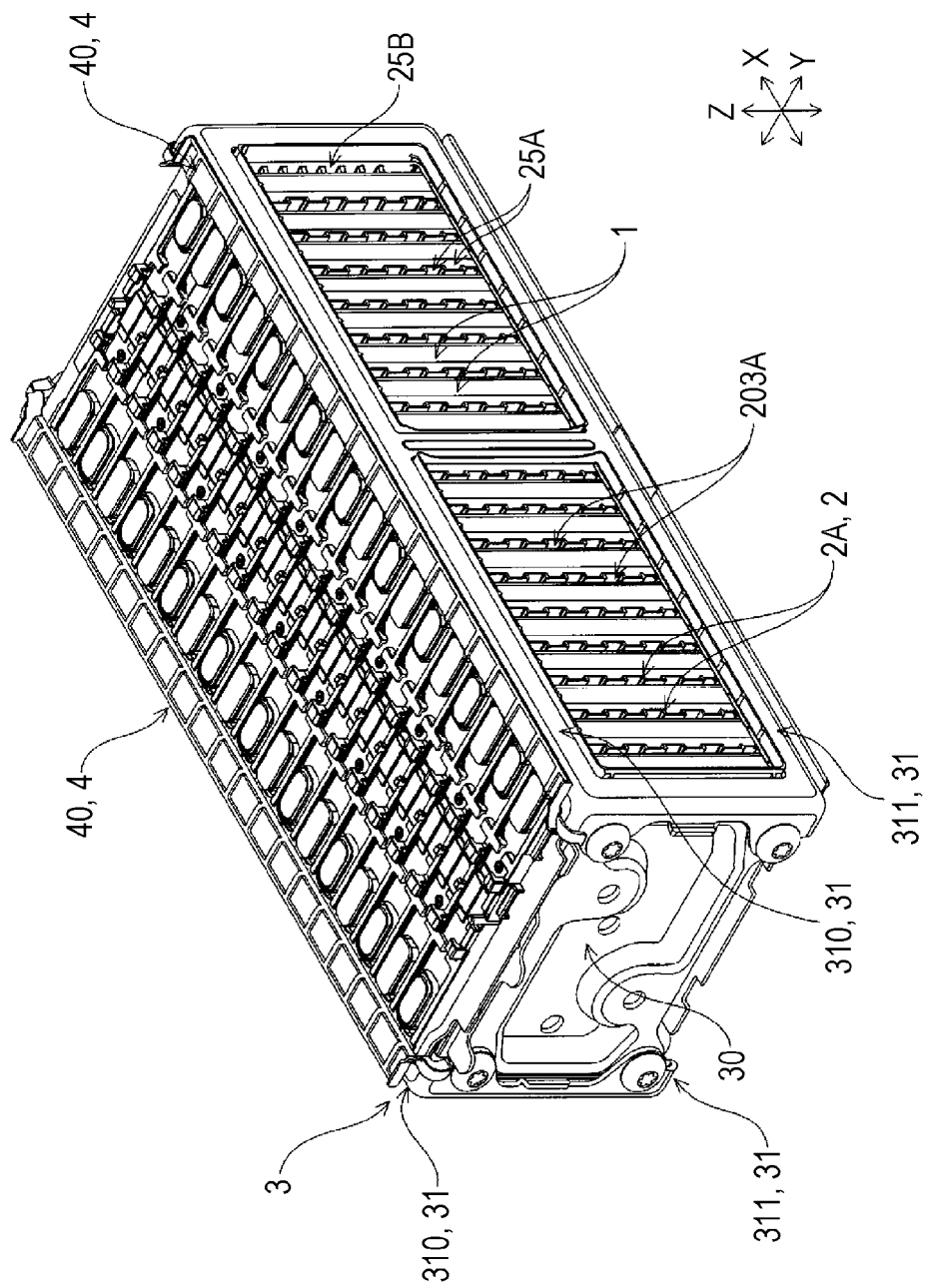
FIG. 1 is a perspective view of an energy storage apparatus according to one embodiment of the present invention.

According to an aspect of the present invention, there is provided an energy storage apparatus including: prismatic energy storage devices which are arranged in a row in a first direction; and a holder which holds the arranged energy storage devices, wherein the holder includes: a pair of terminal members which are arranged outside the arranged energy storage devices in the first direction; a plurality of connecting portions provided for connecting the pair of terminal members to each other and extending along corner portions of the arranged energy storage devices; and at least one reinforcing portion for reinforcing the connecting portions, wherein each one of the plurality of connecting portions has a bent surface which is bent along the corner portion of the energy storage device so as to constrain the corner portion and extends in the first direction, and the reinforcing portion, at a middle position of the connecting portion in the first direction, extends in a direction which intersects with the first direction and along the energy storage device, and connects the connecting portions arranged adjacent to each other.

With this configuration, the connecting portions arranged adjacent to each other with a gap formed therebetween are connected to each other by the reinforcing portion which extends in the gap in a traversing manner and hence, rigidity of the holder against a force applied in a direction of expanding the gap or in a direction of narrowing the gap is enhanced. That is, a force applied to one connecting portion out of the connecting portions arranged adjacent to each other by means of the reinforcing portion is dispersed to the other connecting portion of the connecting portions arranged adjacent to each other by way of the reinforcing portion and hence, rigidity of the holder is enhanced. Further, even when one surface of the bent surface (one surface out of two flat surfaces having a boundary therebetween at a bent position) is pushed by the energy storage device, the connecting portion (the connecting portion where one surface is pushed) is connected to the connecting portion adjacent to the connecting portion by the reinforcing portion and hence, the twisting of the connecting portion is suppressed. Accordingly, even when the energy storage apparatus is miniaturized by decreasing a thickness of the connecting portion, rigidity of the holder can be maintained. That is, rigidity of the holder is not lowered.

The energy storage apparatus may include an inner spacer that is arranged between the energy storage devices and forms a ventilation passage that allows a fluid to flow between the inner spacer and the energy storage devices arranged adjacent to the inner spacer in a second direction orthogonal to the first direction, the reinforcing portion may be the same size as or smaller than one of the energy storage devices in size in the first direction, and overlaps in the second direction with the one of the energy storage devices.

With this configuration, the reinforcing portion is disposed at the position where the reinforcing portion overlaps with the energy storage device at the predetermined position in the second direction and hence, the reinforcing portion does not overlap with an inlet (a position where a cooling fluid flows into the ventilation passage between the connecting portions arranged adjacent to each other) of the ventilation passage formed between the inner spacer and the energy storage device in the second position. Accordingly, even when the reinforcing portion is disposed in a traversing manner in the gap formed between the connecting portions to which a cooling fluid is supplied, lowering of a flow rate (inflow amount) of a cooling fluid which flows into the ventilation passage can be suppressed thus suppressing the lowering of cooling efficiency.

In this case, it is preferable that the reinforcing portion extend in a direction orthogonal to both of the first direction and the second direction.

With this configuration, the whole reinforcing portion overlaps with the energy storage device at the predetermined position in the second direction in the direction orthogonal to both the first direction and the second direction and hence, the lowering of a flow rate of a cooling fluid which flows into the ventilation passage can be suppressed more effectively.

In the energy storage apparatus, it is preferable that the reinforcing portion overlaps in the second direction with the energy storage device arranged at a center position in the first direction or the energy storage device arranged closest to the center position out of the energy storage devices.

With this configuration, center portions or approximately center portions of the connecting portions which extend between the terminal members and are arranged adjacent to each other are connected to each other by the reinforcing portion. Accordingly, compared to the case where portions of the connecting portions offset toward one side from the center portions are connected to each other by the reinforcing portion, this configuration can increase rigidity of the holder.

In the energy storage apparatus, the reinforcing portion may have: a body which extends in a third direction orthogonal to the first direction and the second direction and connects the connecting portions arranged adjacent to each other; and a projecting ridge which projects from the body and extends in the third direction.

With this configuration, rigidity of the reinforcing portion is enhanced and hence, bending of the reinforcing portion in the direction orthogonal to the third direction can be prevented.

In the energy storage apparatus, the projecting ridge may project from a surface of the body on a side opposite to the energy storage device.

With this configuration, even when a cooling fluid impinges on the reinforcing portion when the cooling fluid is supplied to the ventilation passage, the flow of the cooling fluid is divided into both sides in the width direction of the reinforcing portion (the first direction) by the projecting ridge and hence, the flow of the cooling fluid is minimally disturbed. That is, the generation of turbulent flow of the cooling fluid which may be caused when the cooling fluid impinges on the reinforcing portion can be suppressed. Accordingly, the cooling fluid efficiently flows into the ventilation passage thus enhancing cooling efficiency.

In the energy storage apparatus, both ends of the connecting portions may be fixed to the pair of terminal members, and the holder may include a support portion that connects end portions of the pair of connecting portions connected by the reinforcing portion.

With this configuration, in addition to the reinforcing portion, also by the support portion, a force applied to one connection portion out of the connecting portions arranged adjacent to each other can be dispersed to the other connecting portion out of the connecting portions arranged adjacent to each other. Further, the frame structure is formed of the pair of connecting portions, the support portion and the reinforcing portion. As a result, rigidity of the holder can be enhanced.

In the energy storage apparatus, the projecting ridge may have an arc shape projecting toward the side opposite to the energy storage device.

In the energy storage apparatus, the connecting portion may include a fixing portion that is connected to the terminal member, the fixing portion extending in a direction that is orthogonal to the bent surface.

As described above, according to the present invention, it is possible to provide an energy storage apparatus which can realize the miniaturization of the device while maintaining rigidity of a holder.

Hereinafter, one embodiment of the present invention is described by reference to FIG. 1 to FIG. 10. Names of respective constitutional members (respective constitutional elements) of this embodiment are used only for this embodiment, and may differ from names of respective constitutional members (respective constitutional elements) in BACKGROUND.

Figure 2:
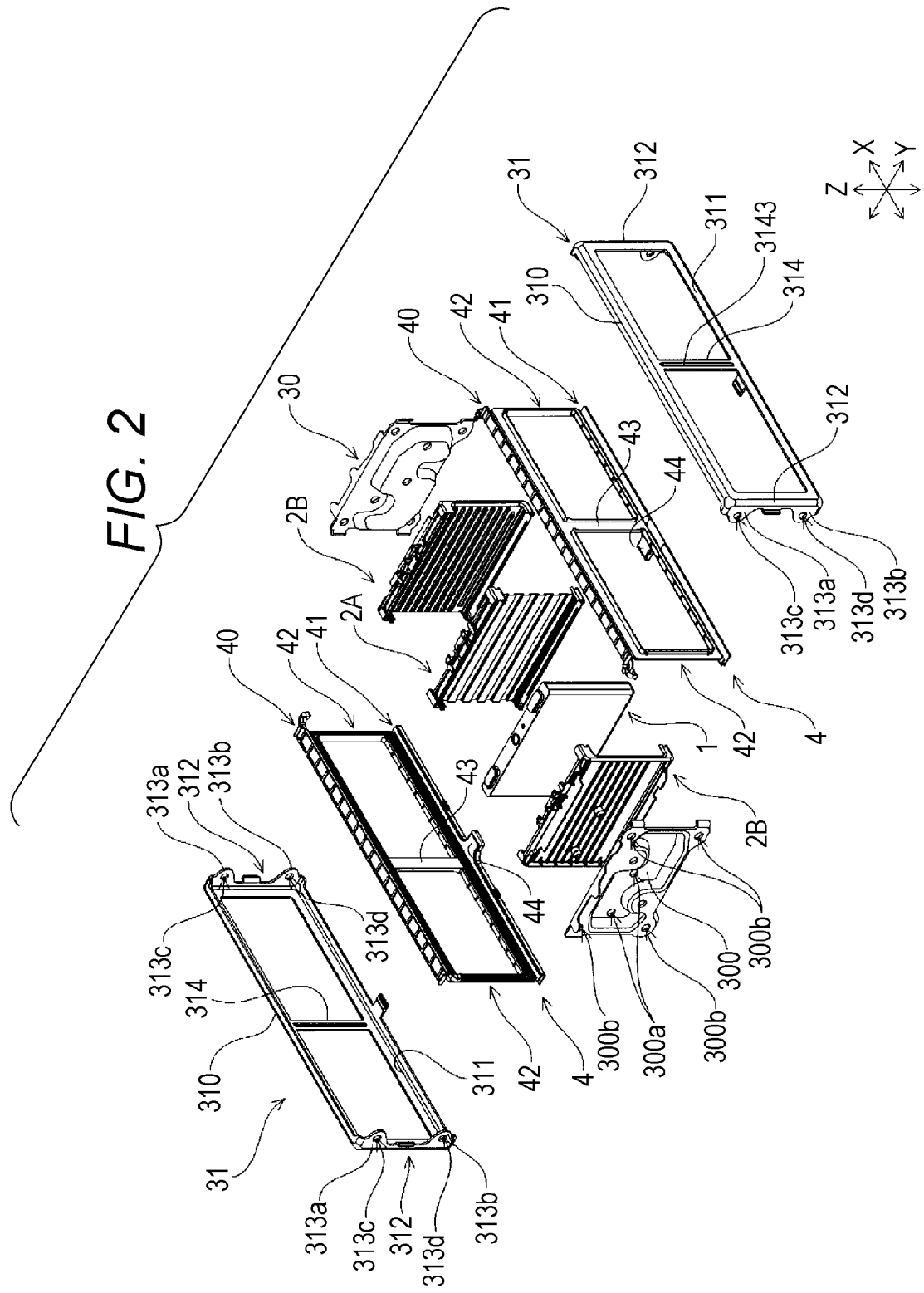
FIG. 2 is an exploded perspective view of the energy storage apparatus with a part omitted.
Figure 3:
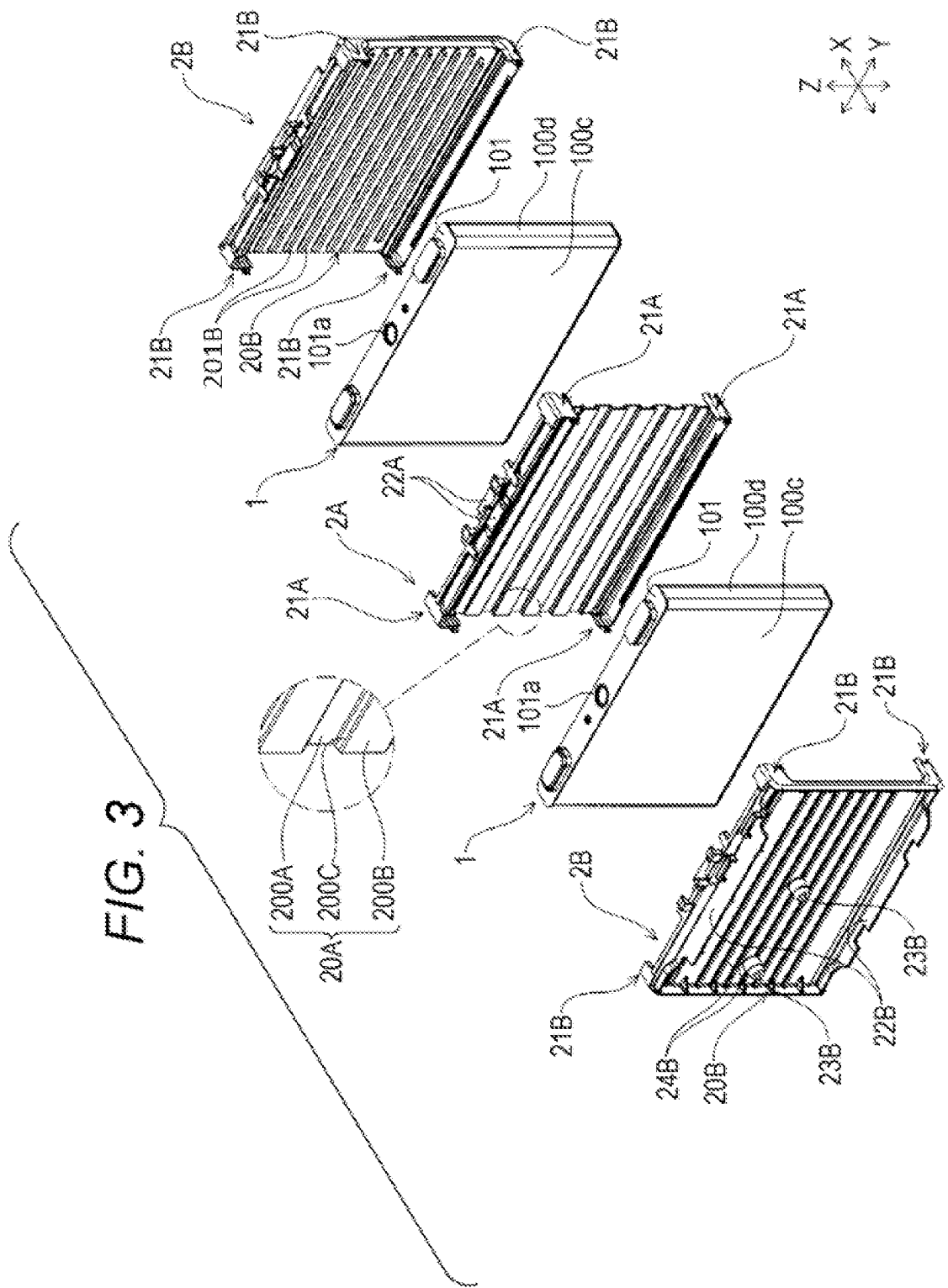
FIG. 3 is an exploded perspective view of the energy storage apparatus with a part omitted.

As shown in FIG. 1 to FIG. 3, an energy storage apparatus includes: energy storage devices 1; spacers 2 which are arranged adjacent to the energy storage devices 1; and a holder 3 which collectively holds the energy storage devices 1 and the spacers 2. The holder 3 is formed by molding by use of an electrically conductive material. In view of such configuration, the energy storage apparatus also includes insulators 4 which are arranged between the energy storage devices 1 and the holder 3.

Figure 4:
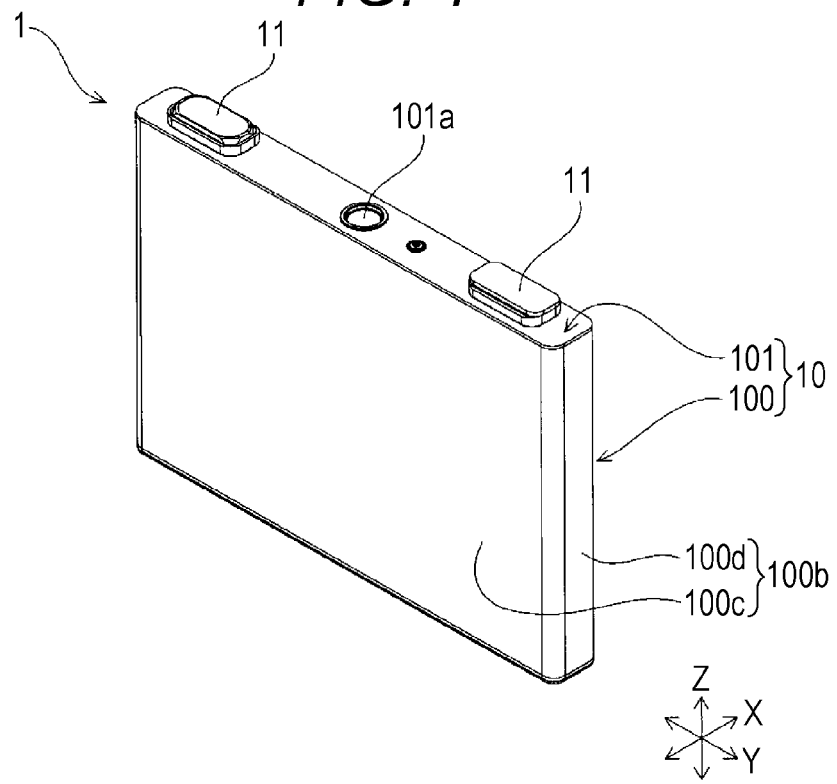
FIG. 4 is a perspective view of an energy storage device in the energy storage apparatus.
Figure 5:
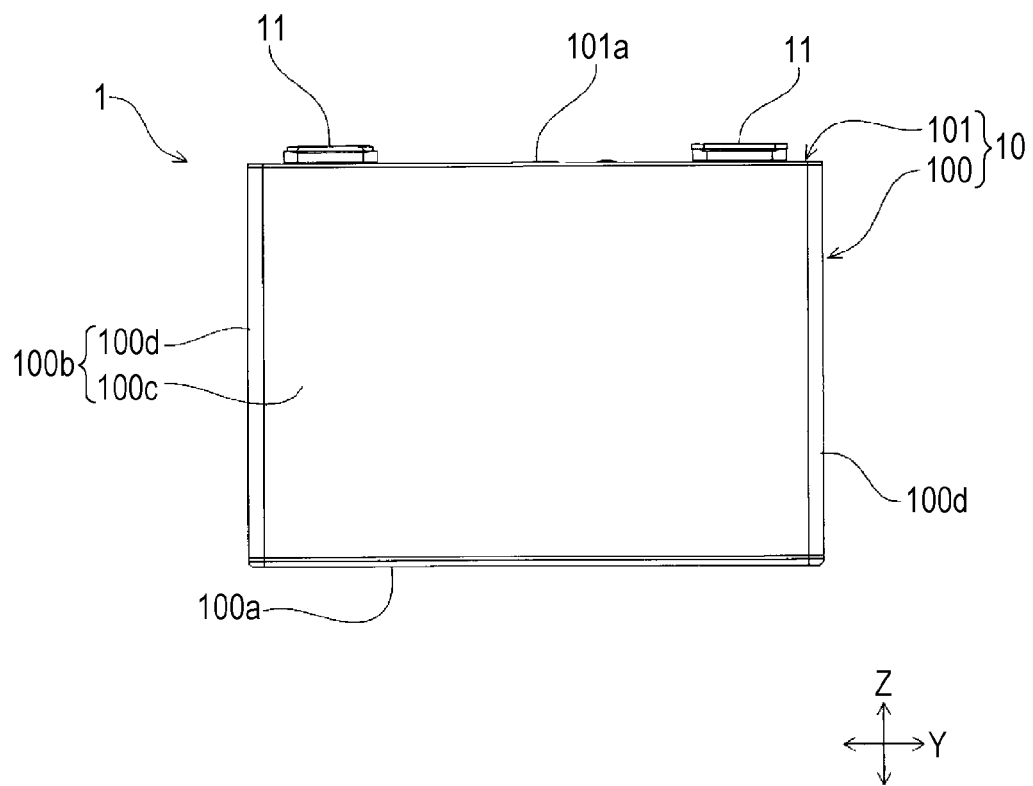
FIG. 5 is a front view of the energy storage device.

As shown in FIG. 4 and FIG. 5, the energy storage device 1 includes: an electrode assembly not shown in the drawing which includes a positive electrode and a negative electrode; a case 10 which houses the electrode assembly; and a pair of external terminals 11 arranged on an outer surface of the case 10. The energy storage device 1 of the embodiment is a so-called prismatic energy storage device.

The case 10 includes: a case body 100 having an opening; and a lid plate 101 which closes the opening of the case body 100 and has the pair of external terminals 11 arranged on an outer surface thereof.

The case body 100 includes: a closed portion 100a (see FIG. 5); and a cylindrical barrel portion 100b which is connected to a periphery of the closed portion 100a so as to surround the closed portion 100a.

The barrel portion 100b includes: a pair of first walls 100c which face each other with a distance therebetween; and a pair of second walls 100d which face each other with the pair of first walls 100c interposed therebetween.

The first wall 100c and the second wall 100d are respectively formed into a rectangular shape. The first wall 100c and the second wall 100d are arranged adjacent to each other in a state where respective end edges of the first and second walls 100c, 100d abut each other. With respect to the first wall 100c and the second wall 100d which are arranged adjacent to each other, the end edge of the first wall 100c and the end edge of the second wall 100d are connected to each other over the entire length. Accordingly, the barrel portion 100b is formed into an angular cylindrical shape. One end of the barrel portion 100b is closed by the closed portion 100a. On the other hand, the other end of the barrel portion 100b of the case body 100 is opened. This opening is closed by the lid plate 101. In the exemplified embodiment, a surface area of the first wall 100c is set larger than a surface area of the second wall 100d. Accordingly, the barrel portion 100b has a flat angular cylindrical shape.

The energy storage apparatus according to the embodiment includes a plurality of energy storage devices 1. The plurality of respective energy storage devices 1 are arranged in a row in one direction (first direction). In the embodiment, the plurality of the respective energy storage devices 1 are arranged in a row in a state where the first walls 100c of the cases 10 are directed in one direction (first direction). The energy storage apparatus includes a bus bar not shown in the drawings which electrically connects the external terminals 11 of two neighboring energy storage devices 1 adjacent to each other.

In the description made hereinafter, for the sake of convenience, the direction (first direction) along which the energy storage devices 1 are arranged in a row is referred to as the X axis direction. Further, in a coordinate system (a rectangular coordinate system) where three axes are orthogonal to each other at a right angle respectively, out of two axial directions which are orthogonal to the direction (X axis direction) along which the energy storage devices 1 are arranged in a row, one direction (second direction) is referred to as the Y axis direction, and the remaining one direction (third direction) is referred to as the Z axis direction. In accordance with such a coordinate system, in the respective drawings, three orthogonal axes (coordinate axes) which respectively correspond to the X axis direction, the Y axis direction and the Z axis direction are described complementarily.

The spacers 2 have insulating property. The spacer 2 includes: a base which is arranged adjacent to the energy storage device 1 (to be specific, the case 10, and to be more specific, the first wall 100c of the barrel portion 100b); and restricting portions which prevent the positional displacement of the energy storage device 1 arranged adjacent to the base.

The spacer 2 is described more specifically. As described above, the energy storage apparatus includes the plurality of energy storage devices 1. In view of such configuration, as shown in FIG. 2 and FIG. 3, the energy storage apparatus includes two kinds of spacers (2A, 2B). That is, the energy storage apparatus includes spacers 2A each of which is arranged between two energy storage devices 1 (hereinafter referred to as "inner spacers"); and spacers 2B which are arranged adjacent to the energy storage devices 1 arranged at both ends out of the plurality of the energy storage devices 1 (hereinafter referred to as "outer spacers").

Firstly, the inner spacer 2A is described. A ventilation passage 25A which allows a cooling fluid to flow therethrough in the Y axis direction (second direction) is formed between the inner spacer 2A and the energy storage device 1 arranged adjacent to the inner spacer 2A. To be more specific, the inner spacer 2A includes a base 20A arranged adjacent to the energy storage device 1 (the first wall 100c of the case body 100); and the restricting portions 21A which suppress the positional displacement of the energy storage device 1 arranged adjacent to the base 20A with respect to the base 20A. The inner spacer 2A also includes valve cover portions 22A which project from the base 20A and are arranged on a lid plate 101 (a gas discharge valve 101a) of the energy storage device 1.

The base 20A of the inner spacer 2A is sandwiched between two energy storage devices 1. That is, the energy storage device 1 is arranged on both sides of the base 20A of the inner spacer 2A in the X axis direction. The base 20A extends in the direction orthogonal to the X axis direction (the direction of Y-Z plane (the plane including the Y axis and the Z axis)). The base 20A of the inner spacer 2A has: a first surface which faces one energy storage device 1 out of two energy storage devices 1 arranged adjacent to each other in an opposed manner; and a second surface which is arranged on a side opposite to the first surface and faces the other energy storage device 1 out of two the energy storage devices 1 in an opposed manner. The base 20A of the inner spacer 2A has an approximately rectangular shape as viewed in the X axis direction. The base 20A has substantially the same size as the first wall 100c of the energy storage device 1 (a size corresponding to a size of the first wall 100c of the energy storage device 1).

In the energy storage apparatus according to the embodiment, a ventilation passage which allows a fluid (a fluid for cooling) to flow therethrough is formed in at least one of a space formed between the first surface of the base 20A of the inner spacer 2A and the energy storage device 1 and a space formed between the second surface of the base 20A of the inner spacer 2A and the energy storage device 1.

The cross section of the base 20A of the inner spacer 2A has a rectangular wave shape. To be more specific, the base 20A of the inner spacer 2A includes: first contact portions 200A which are brought into contact with only one energy storage device 1 out of two energy storage devices 1 arranged adjacent to each other; second contact portions 200B which are brought into contact with only the other energy storage device 1 out of two neighboring energy storage devices 1; and connecting portions 200C which connect the first contact portions 200A and the second contact portions 200B to each other. The first contact portions 200A are elongated in the Y axis direction. The second contact portions 200B are elongated in the Y axis direction.

In the exemplified embodiment, the base 20A of the inner spacer 2A includes a plurality of first contact portions 200A and a plurality of second contact portions 200B. Each first contact portion 200A and each second contact portion 200B are alternately arranged in the Z axis direction.

With this configuration, in the energy storage apparatus, the ventilation passage 25A is formed by the surface of the first contact portion 200A on a side opposite to the surface which is brought into contact with the energy storage device 1 and the pair of connecting potions 200C which is connected to the first contact portion 200A. A cooling fluid (for example, air) for cooling the energy storage device 1 is supplied to the ventilation passage 25A (see the arrow A shown in FIG. 10). The ventilation passage 25A extends in the Y axis direction, and allows the cooling fluid to flow therethrough in the Y axis direction while bringing the cooling fluid into contact with the first wall 100c of the energy storage device 1. Further, in the energy storage apparatus, the ventilation passage 25A is formed by the surface of the second contact portion 200B on a side opposite to the surface which is brought into contact with the energy storage device 1 and the pair of connecting potions 200C which is connected to the second contact portion 200B. This ventilation passage 25A also extends in the Y axis direction, and allows the cooling fluid to flow therethrough in the Y axis direction while bringing the cooling fluid into contact with the first wall 100c of the energy storage device 1. As described above, in the energy storage apparatus, the ventilation passage 25A is formed between the first surface of the base 20A of the inner spacer 2A and the energy storage device 1 and between the second surface of the base 20A of the inner spacer 2A and the energy storage device 1 respectively. Further, the ventilation passage 25A on the side of the first surface of the base 20A of the inner spacer 2A, and the ventilation passage 25A on the side of the second surface of the base 20A of the inner spacer 2A are alternately formed in the Z axis direction between the common energy storage devices 1.

The restricting portions 21A suppress (restrict) the positional displacement of the energy storage devices 1 on both sides in the X axis direction in the Y-Z plane direction with respect to the inner spacer 2A (base 20A). Accordingly, the restricting portions 21A restrict the relative movement between two energy storage devices 1 arranged adjacent to the inner spacer 2A. To be more specific, the restricting portions 21A extend to both sides in the X axis direction from the base 20 respectively. That is, the restricting portions 21A extend toward the energy storage device 1 arranged adjacent to the first surface of the base 20A of the inner spacer 2A from the base 20A, and also extend toward the energy storage device 1 arranged adjacent to the second surface of the base 20A of the inner spacer 2A from the base 20A of the inner spacer 2A.

The energy storage apparatus according to the embodiment includes the polarity of energy storage devices 1 as described above and hence, the inner spacer 2A is arranged at each space between neighboring energy storage devices 1. That is, the energy storage apparatus includes a plurality of inner spacers 2A.

Next, the outer spacer 2B is described by returning to FIG. 2 and FIG. 3. The outer spacer 2B includes: bases 20B arranged parallel to the energy storage device 1; and restricting portions 21B provided for suppressing the positional displacement of the energy storage device 1 arranged to adjacent to the base 20B with respect to the base 20B. The base 20B of the outer spacer 2B expands along the energy storage device 1 (to be more specific, the first wall 100c of the case body 100). The base 20B of the outer spacer 2B has a first surface which faces the energy storage device 1 (to be more specific, the first wall 100c of the case body 100), and a second surface on a side opposite to the first surface.

In the outer spacer 2B according to the embodiment, the base 20B and a terminal member 30 described later of the holder 3 face each other in an opposed manner. That is, the outer spacer 2B is arranged between the energy storage device 1 and the terminal member 30. In view of such configuration, the outer spacer 2B has a fitting portion 22B which engages with the terminal member 30 by fitting engagement at a position which faces the terminal member 30 of the base 20B. That is, the outer spacer 2B has the fitting portion 22B which is provided for determining the position of the terminal member 30 with respect to the base 20B and is formed on the second surface of the base 20B. Further, the outer spacer 2B includes shaft portions 23B which are provided for determining the position of the terminal member 30 with respect to the base 20B and project from the second surface of the base 20B.

The outer spacer 2B has first projecting portions 24B which project toward the terminal member 30 from the second surface of the base 20B and are brought into contact with the terminal member 30. The first projecting portions 24B are referred to as outer contact portions 24B hereinafter. The outer contact portions 24B project toward the terminal member 30 from the base 20B of the outer spacer 2B and are brought into contact with the terminal member 30. Accordingly, in the energy storage apparatus, gaps are formed between the outer spacer 2B and the terminal member 30. Further, the outer spacer 2B of the embodiment includes second projecting portions 201B which project toward the energy storage device 1 from the first surface of the base 20B and are brought into contact with the energy storage device 1. Hereinafter, the second projecting portions 201B are referred to as inner contact portions 201B.

The base 20B of the outer spacer 2B expands in the Y-Z plane direction. The base 20B of the outer spacer 2B has an approximately rectangular shape as viewed in the X axis direction. Further, the base 20B of the outer spacer 2B has a size substantially equal to (corresponding to) a size of the first wall 100c of the energy storage device 1.

Ventilation passages 25B which allow a cooling fluid to flow therethrough are formed between a first surface of the base 20B of the outer spacer 2B and the energy storage device 1. To explain more specifically, the base 20B of the outer spacer 2B includes inner contact portions 201B which extend toward the case 10 of the energy storage device 1 (to be more specific, the first wall 100c of the case body 100) from the first surface of the base 20B.

The inner contact portion 201B extends in the Y axis direction. The base 20B of the outer spacer 2B according to the embodiment includes a plurality of inner contact portions 201B. The plurality of respective inner contact portions 201B are arranged at intervals in the Z axis direction (the direction orthogonal to the longitudinal direction). With this configuration, a plurality of ventilation passages 25B are formed between the base 20B of the outer spacer 2B and the energy storage device 1.

The restricting portions 21B restrict the positional displacement (relative movement) of the energy storage device 1 arranged adjacent to the first surface of the outer spacer 2B with respect to the base 20B. The restricting portions 21B extend toward the energy storage device 1 arranged adjacent to the first surface of the base 20B from the base 20B of the outer spacer 2B.

The energy storage apparatus according to the embodiment includes a pair of outer spacers 2B having the above-mentioned configuration. The outer spacers 2B are arranged adjacent to the outermost energy storage devices 1 out of the plurality of energy storage devices 1. That is, the pair of outer spacers 2B is provided so as to sandwiches the plurality of arranged energy storage devices 1 in the X axis direction.

As shown in FIG. 1 and FIG. 2, the holder 3 includes: a pair of terminal members 30 which are arranged outside the plurality of arranged energy storage devices 1 (hereinafter also referred to as "group of energy storage devices") in the X axis direction; and frames 31 which connect the pair of respective terminal members 30.

The pair of respective terminal members 30 expands along the energy storage devices 1 (to be more specific, the first walls 100c). The terminal members 30 of the embodiment expand in the Y-Z plane direction. The terminal member 30 includes: a first surface which faces the outer spacer 2B in an opposed manner; and a second surface disposed on a side opposite to the first surface. In the embodiment, the terminal member 30 has an approximately rectangular shape (a shape corresponding to a shape of the energy storage device 1) as viewed in the X axis direction, and includes a plurality of (four in the embodiment) through holes 300b formed in respective corner portions thereof. The terminal member 30 includes a pressure contact portion 300 which is brought into contact with the outer contact portions 24B which extend from the base 20B of the outer spacer 2B. The pressure contact portion 300 has insertion holes 300a formed at positions corresponding to the shaft portions 23B of the outer spacer 2B. The shaft portions 23B of the outer spacer 2B are inserted into the insertion holes 300a.

The frame 31 includes: a plurality of connecting portions 310, 311 which are connecting portions for connecting the pair of terminal members 30 to each other and extend along corner portions of the energy storage device stack (the plurality of energy storage devices 1 arranged by way of the inner spacer 2A); and at least one (two in the example of embodiment) reinforcing portion 314 for reinforcing the connecting portions 310, 311. The frame 31 in the embodiment includes: two first connecting portions 310 arranged at positions corresponding to the lid plates 101 of the energy storage devices 1; and two second connecting portions 311 arranged at positions corresponding to the closed portions 100a of the energy storage devices 1.

Figure 6:
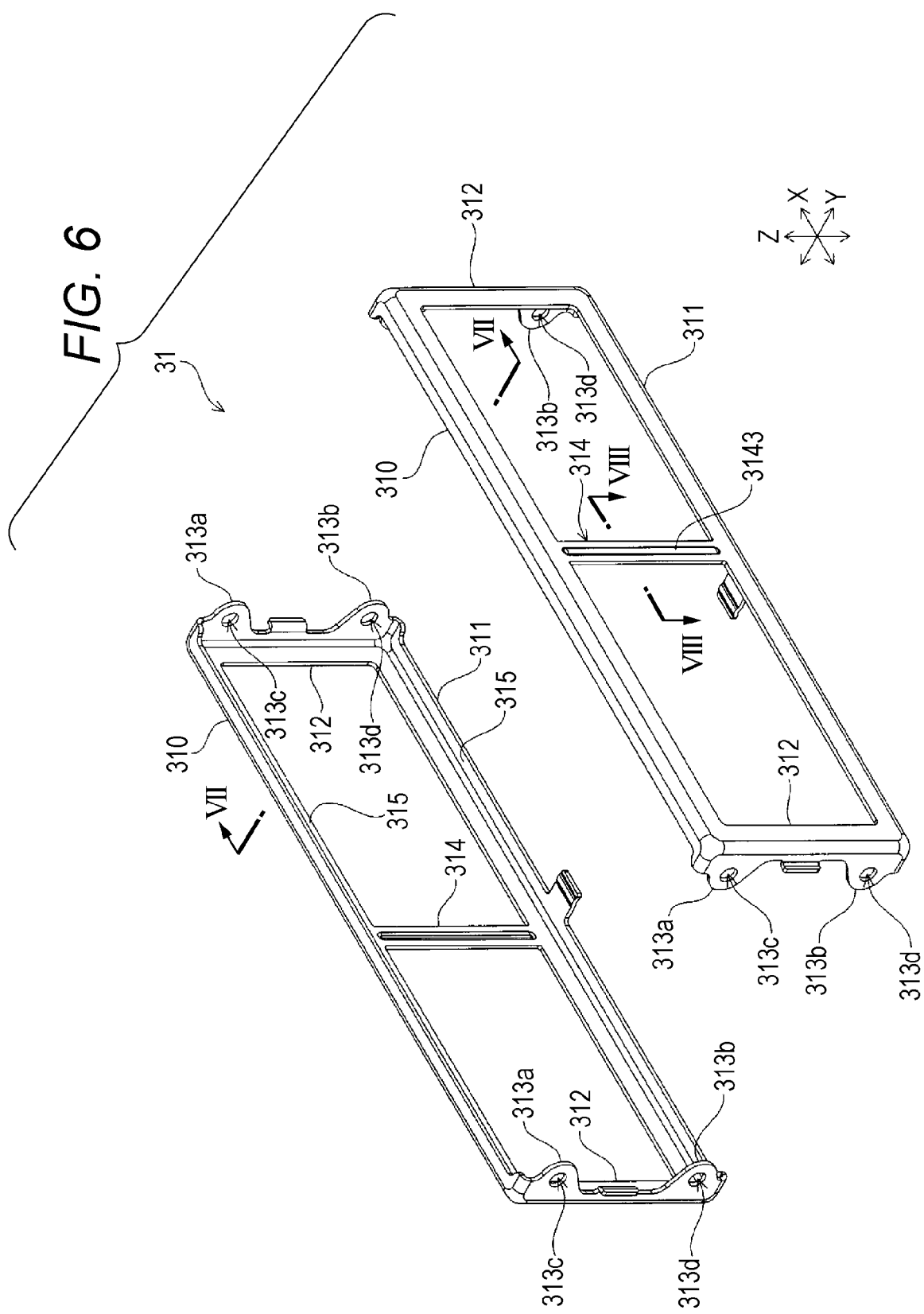
FIG. 6 is a perspective view of a frame of the energy storage apparatus.
Figure 7:
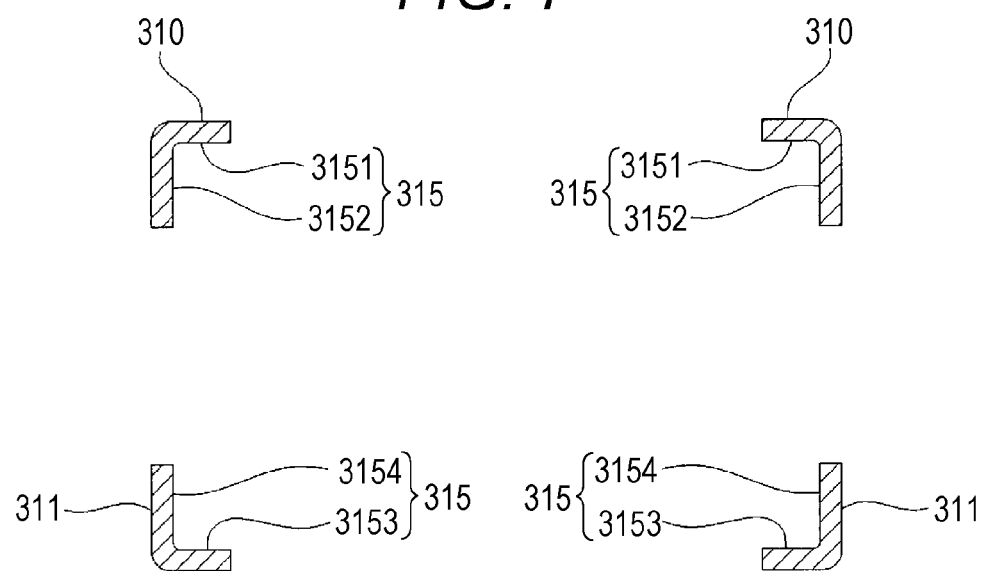
FIG. 7 is an end surface view taken along a line VII-VII in FIG. 6.
Figure 8:
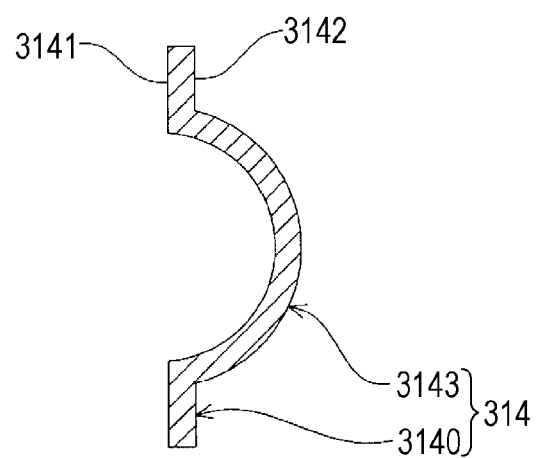
FIG. 8 is an end surface view taken along a line VIII-VIII in FIG. 6.

As also shown in FIG. 6 to FIG. 8, the plurality of respective connecting portions 310, 311 respectively have bent surfaces 315 which are bent along the corner portions of the energy storage device 1 so as to constrain the corner portions, and extend in the X axis direction. To be more specific, the connecting portions 310, 311 have the following configuration. A bent portion (bent position) of the bent surface 315 is not limited to the case where the bent portion is bent at a right angle, and the bent portion may be bent at an obtuse angle or an acute angle, or may be bent so as to have a small radius of curvature.

The first connecting portion 310 extends in the X axis direction, and the cross section (the cross section along the Y-Z plane) of the first connecting portion 310 has a so-called angle shape formed of an L shape. The bent surface 315 of the first connecting portion 310 includes: a first opposedly facing surface 3151 which expands in the X-Y plane direction and faces the lid plate 101 in an opposed manner; and a second oppositely facing surface 3152 which expands in the X-Z plane direction and faces the second wall 100d in an opposed manner.

In the same manner as the first connecting portion 310, the second connecting portion 311 extends in the X axis direction, and the cross section (the cross section along the Y-Z plane) of the second connecting portion 311 has a so-called angle shape formed of an L shape. The bent surface 315 of the second connecting portion 311 includes: a third oppositely facing surface 3153 which expands in the X-Y plane direction and faces the closed portion 100a in an opposed manner; and a fourth oppositely facing surface 3154 which expands in the X-Z plane direction and faces the second wall 100d in an opposed manner.

The frame 31 includes support portions 312 which connect the first connecting portion 310 and the second connecting portion 311 to each other. The support portions 312 extend in the Z axis direction. The support portions 312 connect the corresponding end portions of the pair of connecting portions (the first connecting portion 310 and the second connecting portion 311) arranged on the same side in the Y axis direction with respect to the energy storage device 1. That is, the frame-like portion is formed by the first connecting portion 310, the second connecting portion 311 and the pair of support portions 312.

The first connecting portion 310 has a first fixing portion 313a on either end thereof. The second connecting portion 311 has a second fixing portion 313b on either end thereof.

The first fixing portion 313a formed on one end portion of the first connecting portion 310 faces a through hole 300b formed in one terminal member 30 and a peripheral portion of the through hole 300b in the X axis direction in an opposed manner. The first fixing portion 313a formed on the other end portion of the first connecting portion 310 faces a through hole 300b formed in the other terminal member 30 and a peripheral portion of the through hole 300b in the X axis direction in an opposed manner. In the respective first fixing portions 313a formed on both ends of the first connecting portion 310, first hole portions 313c are formed at positions corresponding to the through holes 300b. The first connecting portion 310 is connected to the terminal members 30 by threadedly engaging nuts on bolts which pass through the through holes 300b formed in the terminal members 30 and the first hole portions 313c formed in the first fixing portions 313a.

The second fixing portion 313b formed on one end portion of the second connecting portion 311 faces a through hole 300b formed in one terminal member 30 and a peripheral portion of the through hole 300b in the X axis direction in an opposed manner. The second fixing portion 313b formed on the other end portion of the second connecting portion 311 faces a through hole 300b formed in the other terminal member 30 and a peripheral portion of the through hole 300b in the X axis direction in an opposed manner. In the respective second fixing portions 313b formed on both ends of the second connecting portion 311, second hole portions 313d are formed at positions corresponding to the through holes 300b. The second connecting portion 311 is connected to the terminal members 30 by threadedly engaging nuts on bolts which pass through the through holes 300b formed in the terminal members 30 and the second hole portions 313d formed in the second fixing portions 313b.

The reinforcing portion 314 connects the connecting portions 310, 311 arranged adjacent to each other. In the embodiment, as described above, the reinforcing portion 314 connects the first connecting portion 310 and the second connecting portion 311 to each other. With this configuration, in the frame 31, the deformation of the first connecting portion 310 and the second connecting portion 311 can be suppressed.

To be more specific, at a middle position of the first connecting portion 310 and the second connecting portion 311 in the X axis direction, the reinforcing portion 314 extends in the direction which intersects with the X axis direction and is arranged along the energy storage device stack. In the embodiment, the reinforcing portion 314 extends in the Z axis direction. The reinforcing portion 314 has a size smaller than a size of the energy storage device 1 in the X axis direction (a size of the second wall 100d in the X axis direction). The reinforcing portion 314 is arranged at the position where the reinforcing portion 314 overlaps with the energy storage device 1 at a predetermined position in the X axis direction in the Y axis direction. The reinforcing portion 314 in the embodiment is arranged at the position where the reinforcing portion 314 overlaps with the energy storage device 1 at the center position in the X axis direction or at the position closest to the center position of the energy storage device stack in the Y axis direction. That is, when the number of energy storage devices 1 which form the energy storage device stack is an odd number, the reinforcing portion 314 is arranged at the position where the reinforcing portion 314 overlaps with the energy storage device 1 at the center position in the Y axis direction, and when the number of energy storage devices 1 which form the energy storage device stack is an even number, the reinforcing portion 314 is arranged at the position where the reinforcing portion 314 overlaps with the energy storage device 1 closest to the center position in the Y axis direction.

In the embodiment, the reinforcing portion 314 includes: a body 3140 having a first surface 3141 which extends in the Z axis direction and faces the energy storage device stack (energy storage device 1) in an opposed manner and a second surface 3142 which extends in the Z axis direction and faces a side opposite to the first surface 3141; and a projecting ridge 3143 which projects from the second surface 3142 of the body 3140 and extends in the Z axis direction (see FIG. 8).

The insulator 4 is formed using a material having insulating property. The insulator 4 includes: a pair of first insulating portions 40 arranged between two respective first connecting portions 310 and the energy storage device 1; and a pair of second insulating portions 41 arranged between two respective second connecting portions 311 and the energy storage device 1. The insulator 4 also includes a pair of third insulating portions 42 which connects the corresponding end portions of the first insulating portion 40 and the second insulating portion 41 to each other and are respectively arranged between the support portions 312 and the energy storage device 1. Further, the insulator 4 includes a fourth insulating portion 43 which connects middle portions of the first insulating portion 40 and the second insulating portion 41 in the X axis direction to each other, and is arranged between the reinforcing portion 314 and the energy storage device 1.

According to the energy storage apparatus having the above-mentioned configuration, the connecting portions (the first connecting portion 310 and the second connecting portion 311) arranged adjacent to each other with a gap formed therebetween are connected to each other by the reinforcing portion 314 which extends in the gap in a traversing manner. Accordingly, rigidity of the holder 3 against a force applied in a direction of expanding the gap or in a direction of narrowing the gap is enhanced. That is, a force applied to one connecting portion (for example, the first connecting portion 310) out of the connecting portions 310, 311 arranged adjacent to each other is dispersed to the other connecting portion (for example, the second connecting portion 311) out of the connecting portions 310, 311 arranged adjacent to each other by way of the reinforcing portion 314 and hence, rigidity of the holder 3 is enhanced. Further, even when one surface of the bent surface 315 (one surface out of two flat surfaces having a boundary therebetween at a bent position (bent portion)) is pushed by the energy storage device 1, the connecting portion (the connecting portion where one surface is pushed, for example, the first connecting portion 310) is connected to the connecting portion (for example, the second connecting portion 311) adjacent to the connecting portion by the reinforcing portion 314 and hence, the twisting of the connecting portion (for example, the first connecting portion 310) is suppressed. This advantage of the energy storage apparatus is specifically described hereinafter.

Figure 9:
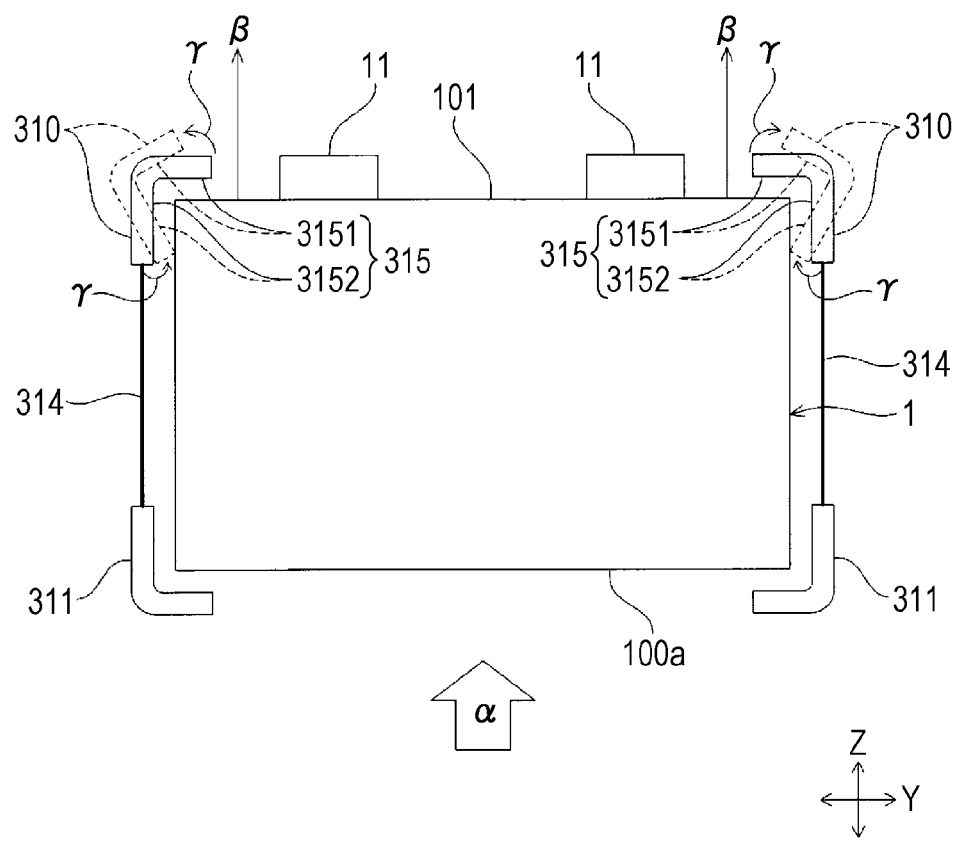
FIG. 9 is a view for describing deformation and twisting of a connecting portion when a force is applied to the energy storage apparatus.
Figure 10:
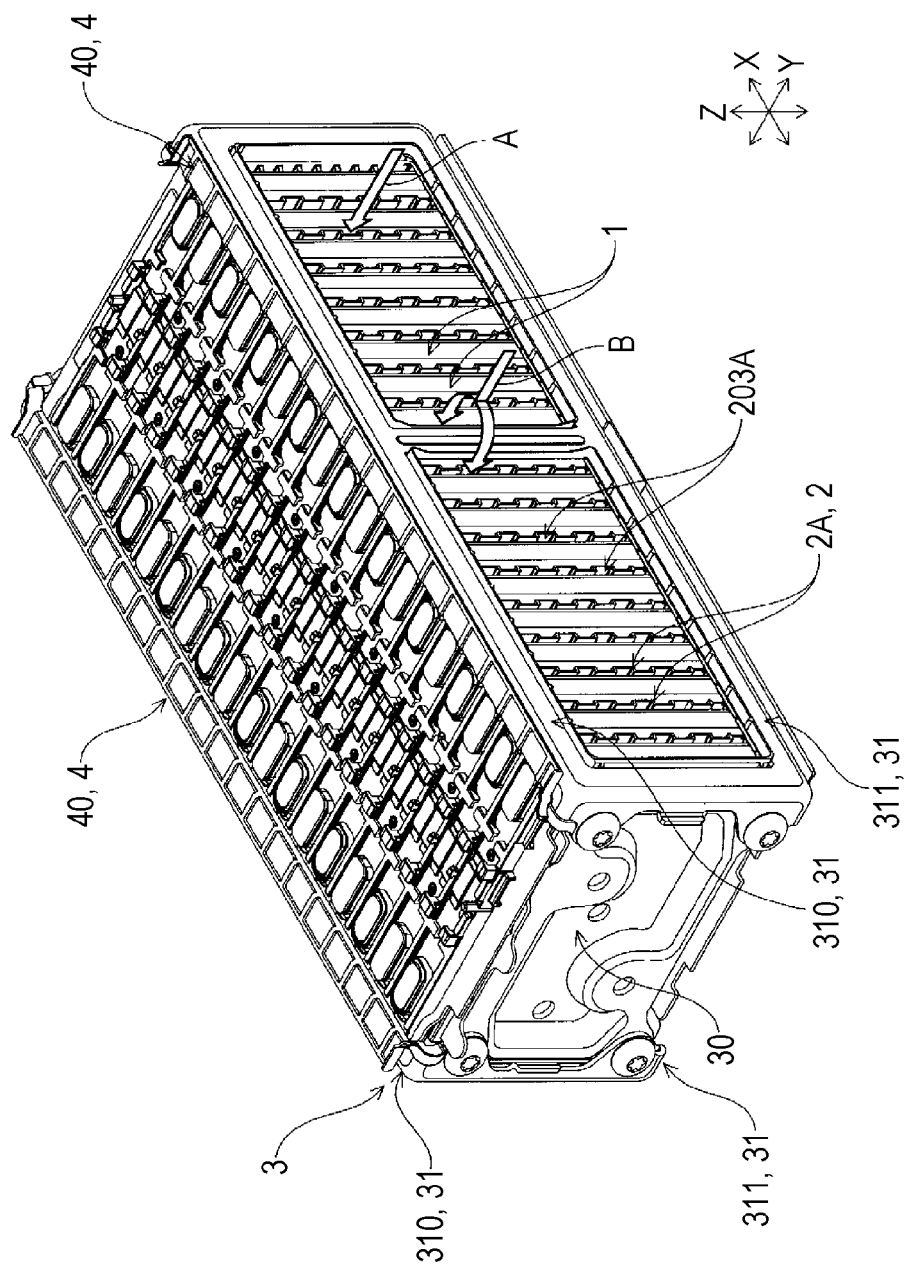
FIG. 10 is a view for describing the flow of a cooling fluid.

For example, as shown in FIG. 9, when an upward force a is applied to a lower end of the energy storage apparatus arranged such that the lid plate 101 of each energy storage device 1 is directed upward, due to the pushed-up energy storage device stack or some energy storage devices 1 which form the energy storage device stack, an upward force β is applied to the first connecting portion 310. For example, when the upward force β is applied to a middle portion of the first connecting portion 310 in the X axis direction, such a portion is going to be deformed in the direction away from the second connecting portion 311. However, the portion is pulled by the reinforcing portion 314 and hence, the deformation of the portion is suppressed. Further, in this case, the upward force β from the energy storage device 1 is applied to only the first opposedly facing surface 3151 with respect to the bent surface 315 of the first connecting portion 310. Accordingly, although the first connecting portion 310 is going to be twisted (see an arrow γ in FIG. 9), the first connecting portion 310 is connected to the second connecting portion 311 by the reinforcing portion 314 and hence, the twisting can be suppressed. In FIG. 9, for the sake of convenience of description, the reinforcing portion 314 is indicated by a bold line. However, in the energy storage apparatus of the embodiment, the first connecting portion 310 and the reinforcing portion 314 have the same thickness (the same size in the Y axis direction).

In this manner, according to the energy storage apparatus of this embodiment, even when the energy storage apparatus is miniaturized by decreasing thicknesses of the connecting portions 310, 311, rigidity of the holder 3 can be maintained. That is, rigidity of the holder 3 is not lowered.

In the energy storage apparatus of the embodiment, the reinforcing portion 314 has the same as or smaller than the energy storage device 1 in size in the X axis direction. Further, the reinforcing portion 314 overlaps in the Y axis direction with the energy storage device 1 which is arranged at a predetermined position in the X axis direction. Accordingly, the reinforcing portion 314 does not overlap with the inlet of the ventilation passage 25A formed between the inner spacer 2A and the energy storage device 1 (the position at which a cooling fluid flows into the ventilation passage 25A between the connecting portions arranged adjacent to each other (between the first connecting portion 310 and the second connecting portion 311)) in the Y axis direction. Accordingly, even when the reinforcing portion 314 is disposed in a traversing manner in the gap formed between the connecting portions to which a cooling fluid is supplied (the gap formed between the first connecting portion 310 and the second connecting portion 311 in the example of the embodiment), the lowering of a flow rate (inflow amount) of a cooling fluid which flows into the ventilation passage 25A can be suppressed. As a result, in the energy storage apparatus of the embodiment, the lowering of cooling efficiency can be suppressed.

Further, in the energy storage apparatus of the embodiment, the reinforcing portion 314 extends in the Z axis direction. To be more specific, the reinforcing portion 314 extends along the longitudinal direction of the second wall 100d in a state where the reinforcing portion 314 overlaps with the second wall 100d of the energy storage device 1 in the Y axis direction. Accordingly, the whole reinforcing portion 314 overlaps with the energy storage device 1 in the Y axis direction. As a result, the lowering of a flow rate of a cooling fluid which flows into the ventilation passage 25A can be further suppressed.

In the energy storage apparatus of the embodiment, the center portions or the approximately center portions of the first connecting portions 310 and the second connecting portions 311 extending between the terminal members 30 in the X axis direction are connected to each other by the reinforcing portion 314. Accordingly, compared to the case where portions of the first connecting portions 310 and the second connecting portions 311 offset toward one side from the center portions in the X axis direction are connected to each other by the reinforcing portion 314, the first connecting portion 310 and the second connecting portion 311 are minimally deformed due to a force applied in the direction that the gaps between the first connecting portions 310 and the second connecting portions 311 are expanded or narrowed. That is, rigidity of the holder 3 can be enhanced.

In the embodiment, the reinforcing portion 314 of the holder 3 has the projecting ridge 3143 which projects from the second surface 3142 of the body 3140 and extends in the Z axis direction. Accordingly, even when a cooling fluid impinges on the reinforcing portion 314 when the cooling fluid is supplied to the ventilation passage 25A, the flow of the cooling fluid is divided into both sides in the width direction of the reinforcing portion 314 (the X axis direction) by the projecting ridge 3143 (see an arrow B in FIG. 10) and hence, the flow of the cooling fluid is minimally disturbed. That is, the generation of turbulent flow of the cooling fluid which may be caused when the cooling fluid impinges on the reinforcing portion 314 can be suppressed. Accordingly, the cooling fluid efficiently flows into the ventilation passage 25A thus enhancing cooling efficiency.

In the embodiment, the holder 3 includes the support portions 312 which connect the corresponding end portions of the pair of connecting portions (the first connecting portion 310 and the second connecting portion 311) connected by the reinforcing portion 314. With this configuration, in addition to the reinforcing portion 314, also by the support portions 312, a force applied to one connection portion (for example, the first connecting portion 310) out of the first connecting portion 310 and the second connecting portion 311 arranged adjacent to each other can be dispersed to the other connecting portion (for example, the second connecting portion 311) out of the first connecting portion 310 and the second connecting portion 311 arranged adjacent to each other. Further, the frame structure is also formed of the pair of connecting portions (the first connecting portion 310 and the second connecting portion 311), the support portions 312 and the reinforcing portion 314. As a result, rigidity of the holder 3 can be further enhanced.

It is needless to say that the energy storage apparatus according to the present invention is not limited to the above-mentioned one embodiment, and various modifications are conceivable without departing from the gist of the present invention.

In the energy storage apparatus of the above-mentioned embodiment, the reinforcing portion 314 connects the first connecting portion 310 and the second connecting portion 311. However, the reinforcing portion 314 may connect the first connecting portions 310 to each other or may connect the second connecting portions 311 to each other. The reinforcing portion 314 may connect the first connecting portions 310 to each other and may connect the first connecting portion 310 and the second connecting portion 311 to each other. Further, the reinforcing portion 314 may connect all (four in the example of the embodiment) connecting portions 310, 311.

Although one reinforcing portion 314 is provided for a pair of connecting portions (the first connecting portion 310 and the second connecting portion 311), two or more reinforcing portions 314 may be provided for the pair of connecting portions. Further, the reinforcing portion 314 may be formed neither at the center position nor at the approximately center position of the first connecting portion 310 and the second connecting portion 311 in the X axis direction, and may be formed at the position largely offset from the center position. Also with this configuration, rigidity of the holder 3 can be enhanced compared to a holder having no reinforcing portion 314.

In the energy storage apparatus of the above-mentioned embodiment, the reinforcing portion 314 extends straightly in the Y axis direction. However, the reinforcing portion 314 may extend in an inclined manner with respect to the Y axis or may be bent.

In the above-mentioned embodiment, the size of the reinforcing portion 314 in the X axis direction is set equal to or smaller than the size of the energy storage device 1 in the X axis direction so as to prevent the reinforcing portion 314 from overlapping with the inlet of the ventilation passage 25A in the Y axis direction. However, the present invention is not limited to such a configuration. The size of the reinforcing portion 314 in the X axis direction may be set larger than the size of energy storage device 1 in the X axis direction.

In the energy storage device 1 of the above-mentioned embodiment, the projecting ridge 3143 is formed on the reinforcing portion 314. However, the present invention is not limited to such a configuration. The projecting ridge may not be formed on the reinforcing portion 314.

Further, the reinforcing portion may have other cross sections (cross sections along the X-Y plane) such as a triangular cross section where the more outside in the Y axis direction a portion of the reinforcing portion is, the smaller a width (a width in the X axis direction) becomes. The reinforcing portion may have an arcuate cross section where the reinforcing portion bulges toward the outside in the Y axis direction. Also with this configuration, the generation of a turbulent flow of a cooling fluid which may be caused when the cooling fluid impinges on the reinforcing portion 314 can be suppressed.

Figure 11:
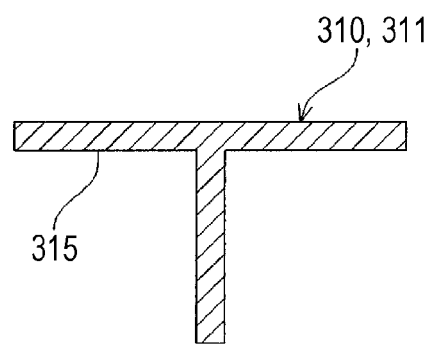
FIG. 11 is a cross-sectional view of a first connecting portion and a second connecting portion in another embodiment.
Figure 12:
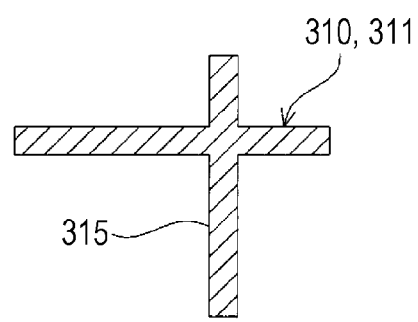
FIG. 12 is a cross-sectional view of a first connecting portion and a second connecting portion in another embodiment.

Specific cross-sectional shapes of the first connecting portion 310 and the second connecting portion 311 are not limited. Although the cross-sectional shapes of the first connecting portion 310 and the second connecting portion 311 in the above-mentioned embodiment are formed into an L shape, the cross-sectional shapes of the connecting portions 310, 311 are not limited to such an L shape. It is sufficient that the first connecting portion 310 and the second connecting portion 311 have the bent surface 315. For example, the first connecting portion 310 and the second connecting portion 311 may have other cross-sectional shapes such as a T shape and a cruciform shape as shown in FIG. 11 and FIG. 12.

What is claimed is:

1. An energy storage apparatus, comprising:
   prismatic energy storage devices that are arranged in a row in a first direction; and
   a holder that holds the energy storage devices,
   wherein the holder includes:
      a pair of terminal members that are arranged outside the energy storage devices in the first direction;
      connecting portions that are arranged outside the energy storage devices in a second direction orthogonal to the first direction; and
      a reinforcing portion that reinforces the connecting portions,
   wherein the connecting portions connect the pair of terminal members and extend in the first direction along corner portions of the energy storage devices,
   wherein each of the connecting portions includes a bent surface that fits the corner portions of the energy storage devices, the bent surfaces constraining the corner portions and extending in the first direction,
   wherein the reinforcing portion, at a middle position of said each of the connecting portions in the first direction, extends in a third direction orthogonal to both of the first direction and the second direction, and connects the connecting portions,
   wherein each of the energy storage devices includes a lid surface, a bottom surface, and a side surface connecting the lid surface and the bottom surface,
   wherein said each of the connecting portions includes:
      a first connecting portion fitting the lid surface and the side surface; and
      a second connecting portion contacting the bottom surface via an insulating member and fitting the side surface,
   wherein the second connecting portion includes an opposedly facing surface which opposedly faces the bottom surface in the third direction,
   wherein a part of the insulating member is disposed between the bottom surface and the opposedly facing surface in the third direction,
   wherein the reinforcing portion is a unitary piece that includes:
      a body that extends in the third direction and connects the first connecting portion to the second connecting portion arranged adjacent to each other, the body including a first surface and a second surface; and
      a projecting ridge that projects from the body in the second direction, the projecting ridge continuously extending in the third direction from a first portion of the body located adjacent to the first connecting portion to a second portion of the body located adjacent to the second connecting portion, the projecting ridge being arranged side by side with the first surface and the second surface in the first direction, and
   wherein the insulating member includes:
      a first insulating portion arranged between the first connecting portion and the energy storage devices;
      a second insulating portion arranged between the second connecting portion and the energy storage devices;
      a pair of third insulating portions which connects corresponding end portions of the first insulating portion and the second insulating portion to each other; and
      a fourth insulating portion which connects middle portions, located in the first direction, of the first insulating portion and the second insulating portion to each other, and is arranged between the reinforcing portion and the energy storage devices.

2. The energy storage apparatus according to claim 1, further comprising an inner spacer that is arranged between the energy storage devices and forms a ventilation passage that allows a fluid to flow between the inner spacer and the energy storage devices arranged adjacent to the inner spacer in the second direction orthogonal to the first direction,
   wherein the reinforcing portion is a same size as or smaller than one of the energy storage devices in size along the first direction, and overlaps in the second direction with the one of the energy storage devices.

3. The energy storage apparatus according to claim 2, wherein the reinforcing portion overlaps in the second direction with an energy storage device of the energy storage devices arranged at a center position in the first direction or the one of the energy storage devices arranged closest to the center position out of the energy storage devices.

4. The energy storage apparatus according to claim 1, wherein the projecting ridge projects from a surface of the body on a side opposite to the energy storage devices.

5. The energy storage apparatus according to claim 1, wherein both ends of the connecting portions are fixed to the pair of terminal members, and
   wherein the holder includes a support portion that connects end portions of the first connecting portion and the second connecting portion connected by the reinforcing portion.

6. The energy storage apparatus according to claim 1, wherein the projecting ridge has an arc shape projecting toward a side opposite to the energy storage devices.

7. The energy storage apparatus according to claim 1, wherein said each of the connecting portions further includes a fixing portion that is connected to the terminal members, the fixing portion extending in a direction that is orthogonal to the bent surface.

8. The energy storage apparatus according to claim 1, wherein the bent surface has an L-shaped cross-section such that said each of the connecting portions fits a corresponding corner of the corner portions of the energy storage devices.

9. The energy storage apparatus according to claim 1, wherein the connecting portions extend in the first direction to cover said each of the energy storage devices.

10. The energy storage apparatus according to claim 1, wherein the bent surface extends in the first direction to cover said each of the energy storage devices.

11. The energy storage apparatus according to claim 1, wherein the connecting portions extend in the first direction to overlap with said each of the energy storage devices in the second direction orthogonal to the first direction.

12. The energy storage apparatus according to claim 1, wherein the first connecting portion is disposed on and overlaps with the lid surface and the side surface.

13. The energy storage apparatus according to claim 12, wherein the second connecting portion is disposed on and overlaps with the bottom surface and the side surface.

14. The energy storage apparatus according to claim 1, wherein the insulating member extends in the first direction from a position, where the insulating member opposedly faces a prismatic energy storage device of the energy storage devices disposed at one end in the first direction, to another position where the insulating member opposedly faces another prismatic energy storage device of the energy storage devices disposed at an other end in the first direction.

15. The energy storage apparatus according to claim 1, wherein an entirety of the reinforcing portion is the unitary piece that, in the third direction, continuously extends from the first connecting portion to the second connecting portion.

16. The energy storage apparatus according to claim 1, wherein the projecting ridge is disposed between the first surface and the second surface in the first direction, and
wherein, in the first direction, the first surface is on an opposite side of the projection ridge as the second surface.

17. An energy storage apparatus, comprising:
prismatic energy storage devices arranged in a row in a first direction; and
a holder holding the energy storage devices,
wherein the holder includes:
a pair of terminal members sandwiching the energy storage devices;
connecting portions arranged outside the energy storage devices in a second direction orthogonal to the first direction, connecting the pair of terminal members, and extending in the first direction along four corners of the energy storage devices, each connecting portion having an L-shaped cross-section such that said each connecting portion fits a corresponding corner of the energy storage devices; and
a reinforcing portion extending in a third direction orthogonal to both of the first direction and the second direction and connecting said each connecting portion at a middle position of the connecting portion in the first direction,
wherein each of the energy storage devices includes a lid surface, a bottom surface, and a side surface connecting the lid surface and the bottom surface,
wherein said each connecting portion includes:
a first connecting portion fitting the lid surface and the side surface; and
a second connecting portion contacting the bottom surface via an insulating member and fitting the side surface, and
wherein the insulating member includes:
a first insulating portion arranged between the first connecting portion and the energy storage devices;
a second insulating portion arranged between the second connecting portion and the energy storage devices;
a pair of third insulating portions which connects corresponding end portions of the first insulating portion and the second insulating portion to each other;
a fourth insulating portion which connects middle portions, located in the first direction, of the first insulating portion and the second insulating portion to each other, and is arranged between the reinforcing portion and the energy storage devices; and
an opening extending between the fourth insulating portion, the first insulating portion, the second insulating portion, and one of the pair of third insulating portions, wherein the opening exposes a surface of at least one of the energy storage devices to an outside in the second direction and the opening overlaps the at least one of the energy storage devices in the second direction.

18. An energy storage apparatus, comprising:
energy storage devices arranged in a row in a first direction;
a spacer arranged between the energy storage devices, the spacer forming a ventilation passage that allows a fluid to flow between the spacer and the energy storage devices in a second direction orthogonal to the first direction; and
a holder holding the energy storage devices,
wherein the holder includes:
a pair of terminal members sandwiching the energy storage devices in the first direction;
connecting portions connecting the pair of terminal members and extending in the first direction along corner portions of the energy storage devices; and
a reinforcing portion connecting the connecting portions and extending in a direction orthogonal to the first direction and the second direction,
wherein each of the energy storage devices includes a lid surface, a bottom surface, and a side surface connecting the lid surface and the bottom surface,
wherein each of the connecting portions includes:
a first connecting portion fitting the lid surface and the side surface; and
a second connecting portion contacting the bottom surface via an insulating member and fitting the side surface,
wherein the insulating member extends in the first direction from a position, where the insulating member opposedly faces a prismatic energy storage device of the energy storage devices disposed at one end in the first direction, to another position where the insulating member opposedly faces another prismatic energy storage device of the energy storage devices disposed at an other end in the first direction, and
wherein the insulating member includes:
a first insulating portion arranged between the first connecting portion and the energy storage devices;
a second insulating portion arranged between the second connecting portion and the energy storage devices;
a pair of third insulating portions which connects corresponding end portions of the first insulating portion and the second insulating portion to each other;
a fourth insulating portion which connects middle portions, located in the first direction, of the first insulating portion and the second insulating portion to each other, and is arranged between the reinforcing portion and the energy storage devices; and an opening extending between the fourth insulating portion, the first insulating portion, the second insulating portion, and one of the pair of third insulating portions, wherein the opening exposes a surface of at least one of the energy storage devices to an outside in the second direction and the opening overlaps the at least one of the energy storage devices in the second direction.

19. The energy storage apparatus according to claim 18, wherein, along the first direction, the reinforcing portion is smaller than one of the energy storage devices.

20. The energy storage apparatus according to claim 19, wherein, when viewed from the second direction, the reinforcing portion overlaps with the one of the energy storage devices.

* * * * *